United States Patent Office 3,030,420
Patented Apr. 17, 1962

3,030,420
REACTION OF PENTABORANE(9) WITH BENZENE OR ALKYLBENZENES
Elmar R. Altwicker, Dayton, Ohio, assignor to Olin Mathieson Chemical Corporation, a corporation of Virginia
No Drawing. Filed Mar. 22, 1957, Ser. No. 647,926
3 Claims. (Cl. 260—606.5)

This invention relates to fuels, and more particularly, to solid organo-boron fuels.

The fuels of this invention, when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse; appreciable increases in performance will result from the use of higher specific impulse materials. The fuels of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

According to my invention, solid reaction products of pentaborane-9 and benzene or lower monoalkyl benzenes are prepared by reacting them with each other. Among the lower alkyl benzenes which are suitable are toluene, ethylbenzene, isopropyl benzene and the like. In general, the molar ratio of benzene or lower monoalkyl benzene to pentaborane(9) introduced into the reaction zone is within the range from 0.5 to 2.0 and the reaction is conducted at a temperature within the range from 20° C. to 175° C. The reaction time can be varied widely, reaction times of from 2 to 100 hours or more being suitable.

The following examples illustrate my invention. In the examples, the term "moles" signifies gram moles.

*Example I*

A reaction vessel having a capacity of 0.56 liter was attached to a vacuum system and evacuated. 65.3 millimoles of pentaborane(9) and 63.4 millimoles of benzene were condensed into the vessel while it was maintained at −196° C. The reactor was then sealed and heated for 20 hours at 150° C. in an oven. At the end of this time, a considerable amount of dark brown solid as well as a yellow oily liquid was present in the reactor.

The contents of the reactor were cooled to −196° C. and the reactor was then opened to the vacuum line. 10 millimoles of non-condensable gas, presumably hydrogen, was pumped off through a −196° C. trap. The contents of the reactor were then warmed to room temperature and transferred to a fractionation train by the use of a vacuum. A brown solid remained in the reactor. This brown solid amounted to about 0.5 gram and 2 analyses showed that it contained 47.4, 46.4 weight percent of boron.

*Example II*

Using the procedure described in Example I, 71.9 millimoles of benzene and 75.2 millimoles of pentaborane(9) were reacted for seven hours at 150° C. in the 0.56 liter capacity reactor. The contents of the reactor were then cooled to room temperature and materials which were volatile under a vacuum were removed. There remained in the flask a small amount of brown solid as well as a red-brown glass-like solid.

A similar run over a reaction period of four hours gave similar results, except that a smaller amount of solids was produced.

*Example III*

Into a 125 milliliter flask equipped with a ball joint was placed one gram of anhydrous aluminum chloride and a magnetic stirrer. The flask was then attached to a vacuum line and evacuated. 46.0 millimoles of pentaborane(9) and 48.5 millimoles of benzene were condensed into the flask at −196° C. The contents were then warmed to room temperature (25° C.) and stirred. Periodically, the contents of the flask which were not condensable at −196° C. were pumped off the flask by the application of a vacuum. Over a period of about 60 hours at room temperature (37° C. was the highest temperature reached), a considerable amount of non-condensable material was pumped off in this manner. At the conclusion of the 60 hour period, all material volatile at about 0° C. was removed from the flask under vacuum. In the flask there then remained an orange-brown, boron-containing solid mass.

*Example IV*

20.2 millimoles of toluene and 18.2 millimoles of pentaborane(9) were condensed into a 0.13 liter reaction flask maintained at −196° C. The contents were then heated to 150° C. and held at that temperature for a period of 4 hours. Following this, the flask and contents were permitted to cool to room temperature and volatile materials were removed by the application of a vacuum. There then remained in the reaction flask 0.0226 gram of a reddish-brown, boron-containing solid.

The boron containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizable material and the oxidizer, the final propellant can also contain up to 20 percent by weight of an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the production of a solid reaction product of pentaborane(9) and a material selected from the group consisting of benzene and lower monoalkyl benzenes which comprises reacting pentaborane(9) and from 0.5 to 2.0 moles, per mole of pentaborane(9), of said material at a temperature within the range from 20° C. to 175° C.

2. The method of claim 1 wherein said material is benzene.

3. The method of claim 1 wherein said material is toluene.

No references cited.